US006827082B1

(12) United States Patent
Kogan et al.

(10) Patent No.: US 6,827,082 B1
(45) Date of Patent: Dec. 7, 2004

(54) REACTION CHAMBER WITH A PROTECTED SURFACE

(75) Inventors: Abraham Kogan, Shaked, D.N., Menashe 37862 (IL); Meir Kogan, Maalot (IL)

(73) Assignee: Abraham Kogan, Shaked (IL)

( * ) Notice: Subject to any disclaimer, the term of this patent is extended or adjusted under 35 U.S.C. 154(b) by 68 days.

(21) Appl. No.: 10/049,433

(22) PCT Filed: Aug. 8, 2000

(86) PCT No.: PCT/IL00/00483

§ 371 (c)(1),
(2), (4) Date: Sep. 4, 2002

(87) PCT Pub. No.: WO01/12314

PCT Pub. Date: Feb. 22, 2001

(30) Foreign Application Priority Data

Aug. 12, 1999 (IL) ................................................ 131371

(51) Int. Cl.[7] .............................. F24J 2/04; B01J 19/12
(52) U.S. Cl. ........................ 126/680; 126/634; 250/435; 422/258
(58) Field of Search ................................. 126/680, 634, 126/643, 648, 651, 652, 701; 210/748; 250/435; 422/258, 255, 307, 308, 224

(56) References Cited

U.S. PATENT DOCUMENTS 1,969,655 A * 8/1934 Mailey ..................... 422/186.3
3,927,659 A * 12/1975 Blake et al. ................ 126/643
3,994,131 A * 11/1976 Karino ....................... 422/174
4,475,538 A * 10/1984 Percival et al. ............. 126/648
4,499,893 A   2/1985 Hunt et al.
5,931,158 A * 8/1999 Buck ........................... 126/680
5,947,114 A * 9/1999 Kribus et al. ............... 126/680

FOREIGN PATENT DOCUMENTS

| GB | 831118 | 3/1960 |
| IL | 112658 | 11/1995 |
| WO | WO 90/13360 A1 | 11/1990 |
| WO | WO 96/25633 A1 | 8/1996 |

OTHER PUBLICATIONS

Ganz, J. et al. "A New Type of Reactor for Solar Thermal Metallic Oxide Reduction," Energy and Process Technology Laboratory, Paul Scherrer Institue, CH–5332 Villigen, Switzerland.

(List continued on next page.)

*Primary Examiner*—Josiah Cocks
(74) *Attorney, Agent, or Firm*—Browdy and Neimark, P.L.L.C.

(57) ABSTRACT

A reaction chamber has a surface to be protected and a longitudinal axis transverse to this surface. For the protection of the surface, a method is used comprising introducing a primary flow of reactants into the chamber in a manner whirling around the longitudinal axis thereof, withdrawing reaction products at an opposite end of the reaction chamber in a flow along the longitudinal axis, and introducing into the chamber a secondary protecting flow directed from a periphery of the surface towards the longitudinal axis. The primary flow and the flow of reaction products approximate a free vortex flow and a pressure created by this vortex flow keeps the secondary flow adjacent the surface to be protected, substantially over its entire area.

22 Claims, 7 Drawing Sheets

OTHER PUBLICATIONS

Schlichting, Hermann, *Boundary Layer Theory*, McGraw–Hill Book Co., Inc., New York, 1995 (Chapter V11, pp. 94–101).

Batchelor, G.K. *An Introduction to Fluid Dynamics*, Cambridge at the University Press, 1967 (pp. 314–319).

Greenspan, H.P. *The Theory of Rotating Fluids*, Cambridge at the University Press, 1968 (pp. 1–5).

Karni, J. *The Diapr: A High–Pressure, High–Temperature Solar Receiver*, Solar Engineering, vol. 1, ASME, 1995 (pp. 591–595).

Litterst, T. "Investigation of Window Damage by Hot Particles in Solar Heated Circulating Fluidized Beds," Germany, (pp. 359–369).

"Research & Development of the Process Technology for Converting Solar Energy into Chemical Fuels," Final Report, Bundesamt für Energie–Contract EF–REN (92)033, Paul Scherrer Institut (pp. 149–161).

* cited by examiner

REACTION CHAMBER WITH A PROTECTED SURFACE

FIELD OF THE INVENTION

This invention relates to reaction chambers having ingress and egress openings, and a surface to be protected from contact with components of the reaction, in particular, for use in solar energy receivers for the protection of their transparent windows.

BACKGROUND OF THE INVENTION

Extensive work has been directed in recent years to the development of efficient ways to use concentrated solar radiation as the energy source driving endothermic chemical reactions, such as for example, the production of hydrogen and carbon black by pyrolysis of methane using solar energy for process heat.

One type of a solar reactor which may be used for such a purpose is a "surface receiver" wherein concentrated solar radiation is introduced through the receiver's aperture into its cavity, while the reactants flow through tubes staggered in different arrangements inside the cavity. In such a type of reactor, the radiation is absorbed at the surface of the tubes, and the heat required for carrying out the reaction is transferred through the tubes' walls to reactants flowing inside the tubes. However, such reactors are rather bulky and their working temperature is restricted by thermal limitations imposed by the tube material and the temperature gradient across the tube walls.

In an attempt to overcome these difficulties, another type of solar reactor has been developed, called a "volumetric receiver". In such a receiver, the reactants are directly introduced into the reactor's chamber where they themselves are exposed to direct concentrated solar radiation that enters the chamber through a transparent window. The use of such reactors elimates the need for incorporating tubes, whereby the overall heat transfer efficiency of the process is increased. An example of such a solar volumetric receiver, designed for solar heating of compressed air, was described by J. Karni et al., Proc. ASME/JSME/JSES Int Solar Eng.Conf., 1: 551–556, 1995.

However, in many chemical reactions some of the reactants and/or products of the reaction are in the form of particles. This fact presents a problem when a volumetric receiver is considered for such a reaction, because particles will eventually be deposited on the surface of the transparent window of the receiver, reducing its transparency. Moreover, the radiation that will be absorbed by these particles will cause their immediate heating up, leading to the generation of hot spots at the window, and consequently to the disintegration of the window.

Many attempts have been made to overcome this problem, and the following are typical examples of such attempts described in the literature.

Litterst (Proc. 6th Inst. Symp. On Solar Thermal Concentrating Technologies, Almeria, 1992, pp. 359–369) experimented with a vertical fluidized bed reactor, having a transparent window mounted on a cylindrical wall of the reactor. Reactants are introduced in the reactor in a primary flow parallel to the window and an air curtain is provided parallel to the primary flow direction adjacent to the window's inner surface to protect it against contact with solid particles. This attempt failed as the thin air curtain adjacent the window's inner surface detached therefrom under the influence of the primary flow of reactants, a short distance from its entry port. An attempt to remove the window from the primary flow by mounting it on a T-type branch did not fair much better. Solid particles were transported in "pulse-like eruptions" from the fluidized bed towards the window. An attempt to decelerate fast particles by injecting compressed air through radially positioned tubes near the window's inner surface showed that huge amounts of air, in the order of 50% of the primary reactant flowrate, were required to keep the window free of contact with solid particles.

A cylindrical volumetric solar reactor with a transparent window mounted adjacent a front end of the reactor's cavity and spaced away therefrom by an aperture plane, is described in the Paul Scherrer Institute, Final Report to Bundesamt fur Energie—Contract EF-REN (92) 033, p. 149. Here a suspension of ZnO powder in natural gas is injected into the reactor's cavity in a tangential primary flow adjacent a back end thereof. The products of reaction leave the cavity through a tangential outlet port located at the front end thereof. The window is kept clean of suspended particles by means of two auxiliary flows of gas, one injected tangentially at the window and one injected radially at the aperture plane. The design was optimized to minimze the auxiliary flows while keeping the window clear of particles, however, the total auxiliary gas flowrate was 83% of the primary gas flowrate. Such a high auxiliary gas flowrate can absorb the heat received by the reaction cavity and thereby interfere with the desired reaction.

A solar receiver described in WO 96/25633 comprises an axially symmetric annular chamber with an inner wall constituted by a fiusto-conical or cylindrical quartz window through which solar radiation is admitted into the chamber. A fluid mixture in the form of a particle suspension is injected into the chamber adjacent and tangentially to an end of its outer wall and the products of the reaction are withdrawn near an opposite end of the outer wall and tangentially thereto, whereby the suspension flows around the inner wall in a whirling manner. Due to the centrifugal force acting on the whirling particle suspension, contact between particles and the window is minimized. To cool the window, the inner surface of the window is swept with a particle-free pressurized fluid.

SUMMARY OF THE INVENTION

An object of the present invention is to provide a novel solution for efficient protection of a surface in a reaction chamber.

In accordance with one aspect of the present invention, there is provided a method for protecting a surface at one end of a reaction chamber having a longitudinal axis transverse to said surface, the method comprising introducing a primary flow of reactants into the chamber in a manner whirling around said longitudinal axis, and withdrawing reaction products at an opposite end of the reaction chamber in a flow along the longitudinal axis, whereby said primary flow and said flow of reaction products approximate a free vortex flow, and introducing into the chamber a secondary protecting flow directed from a periphery of said surface towards said longitudinal axis, enabling thereby a pressure created by said vortex flow to keep said secondary flow adjacent said surface substantially over its entire area.

By virtue of the method of the present invention, a negative radial pressure gradient created by the vortex flow increases steeply towards said longitudinal axis and, therefore, towards the center of the surface to be protected, acting as an anchor to pull the secondary flow from the periphery to the center as a boundary layer without separation. This allows for the protection of the surface by the secondary flow with a significantly lower flowrate than that of the primary flow.

A further advantage of the present invention is that the path length of the whirling primary flow across the chamber is substantially extended when compared with the chamber's axial dimension, thereby contributing to achieving higher thermal and chemical conversion efficiencies, since the vortex flow provides strong mixing of the reactants. This mixing effect also helps in preventing strong local temperature gradients in the primary flow, which could lead to flow instability due to buoyancy.

The method of the present invention is particularly useful for reaction chambers wherein a reaction is carried out in which at least one component, a reactant, a product or a catalyst, is in a particulate form. The term "particulate form" as used in the present application denotes primarily a solid material being in the form of powder or particles, but may relate also to materials being in the form of liquid droplets.

The secondary protective flow may be an inert gas, but preferably is one of the reactants or products, or a mixture thereof, provided that it does not contain particles and that it is not heated in the chamber to the extent that will prevent its use in protecting the transparent window as desired, or to the extent that will cause the reaction to proceed in the secondary flow to a significant degree. Although by a preferred mode of the invention the secondary flow is in the gaseous phase, it should be understood that within the scope of the present invention it may also be in a liquid phase.

In accordance with another aspect of the present invention, there is provided a reaction chamber having a surface to be protected, and ingress and egress means designed to provide the primary and secondary flows described above. In particular, the reaction chamber has a primary ingress means adapted for introducing into the chamber the primary flow along a circumference of the chamber at a location axially spaced from the surface. It is preferable in this case that the surface and the chamber are substantially symmetric about the longitudinal axis of the chamber. It is also preferable that the primary ingress means are capable of introducing into the chamber the primary flow essentially tangentially to the chamber's circumference to achieve a whirling flow. Appropriate ingress means are therefore typically annular and may be in the form of an impeller-like ring. It may be advantageous if the primary ingress means are capable of delivering the primary flow into the chamber in the form of a substantially conical jet, flowing away from the surface. The primary ingress means may be designed to introduce the flow in a converging or diverging manner.

The reaction chamber also has secondary ingress means adapted for introducing into the chamber the secondary flow in close proximity to a periphery of the surface. It is preferable that the secondary ingress means are capable of introducing the secondary flow essentially radially relative to the longitudinal axis. Egress means for withdrawing the reaction products are preferably in the form of an outlet port located along the longitudinal axis of the chamber at its end opposite to the surface, thus promoting the contained whirling motion that approximates a free vortex flow. Preferably, the outlet port is narrow relative to the dimension of the surface to be protected. The outlet port of the chamber may be connectable to any suitable downstream equipment, e.g. conventional gas-solid separation equipment, beat-exchanger or any other equipment as known per se in the art.

A preferred embodiment of the method and reaction chamber of the present invention concerns their use in a volumetric solar receiver having a reaction chamber and provided with effective protection of a transparent window located in a wall thereof and adapted for admitting concentrated solar radiation therein. The secondary flow according to this embodiment of the invention should preferably be a poor absorber of solar radiation and is, preferably, a non-absorbing fluid. In addition to being a protective layer, when the secondary flow is introduced at a relatively low temperature into the chamber, it will cool an inner surface of the window mainly by convecting the heat therefrom, whereby thermal loads to which the window is subjected are reduced.

The window may be planar, concave or convex, or rather it may be in the form of any appropriate surface of revolution.

The reaction chamber may have an interior design capable of directing the primary flow in a desired marmer, for example, the interior wall of the chamber may be shaped so that the primary flow entering the chamber as a conical jet flows along the chamber's interior wall. Heating of the primary flow is greatly enhanced by heat transfer from the chamber's interior wall.

An initial widening of the chamber in the flow direction of the primary flow renders the chamber's diameter larger than the window's diameter and, thereby, makes the chamber's shape closely approximate a black body radiation cavity.

The receiver's performance, and particularly its performance during the start up of the reaction carried out therein, may be improved by introducing into the chamber additional solar radiation absorbing particles. These particles are adapted to serve as solar radiation absorbents, allowing a rapid elevation of the temperature of the primary flow in the chamber. These solar radiation absorbing particles may be introduced as a mixture together with the primary flow, or separately, via ingress means dedicated for their introduction into the chamber.

The receiver may further be provided with third ingress means in a region exterior to the receiver chamber, in close proximity of the transparent window, to introduce therein a cooling fluid in an essentially radial or tangential flow.

DESCRIPTION OF THE DRAWINGS

For better understanding, the invention will now be described by way of example only, with reference to a specific example being the pyrolysis of methane. It should be understood that this example is provided for demonstrating the invention, but in no way is the invention limited to this specific process.

DESCRIPTION OF PREFERRED EMBODIMENTS

Figure 1:
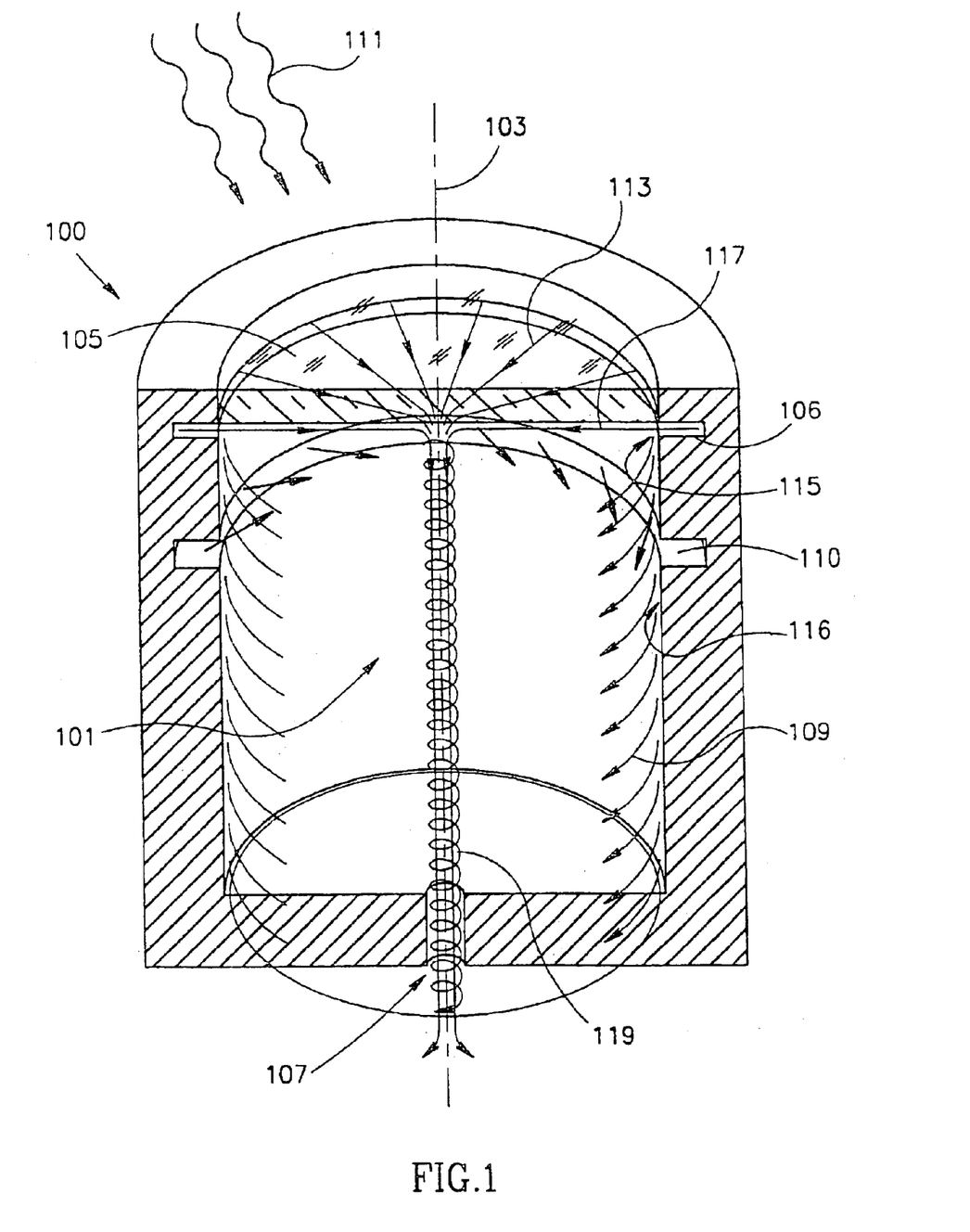
FIG. 1 is a general schematic view of a reacon chamber which is the subject of the present invention.

FIG. 1 shows a reactor 100, according to the present invention, that has a reaction chamber 101 with a longitudinal axis of symmetry 103. The reaction to chamber 101 has a transparent window 105 disposed at its front end and orientated perpendicularly to the longitudinal axis 103. The reactor 100 has a primary ingress means in the form of an impeller-like ring 110 (shown in FIG. 2) which is capable of introducing into the chamber 101 a primary flow 109 of reactants in a manner whirling around the longitudinal axis 103, and a secondary ingress means 106 capable of introducing into the chamber a secondary protecting flow 113 directed from an inner periphery 115 of the window 105 towards the longitudinal axis 103. At a rear end, the reaction chamber 101 has an outlet 107 disposed along the axis 103 and capable of withdrawing reaction products from the chamber 101.

For the purpose of the description, the present reactor 100 is described for carrying out a process defined by the following reaction:

in which methane is pyrolyzed by the heat of concentrated solar radiation 111 introduced into the chamber 100 via the transparent window 105, to form carbon and hydrogen.

Figure 2:
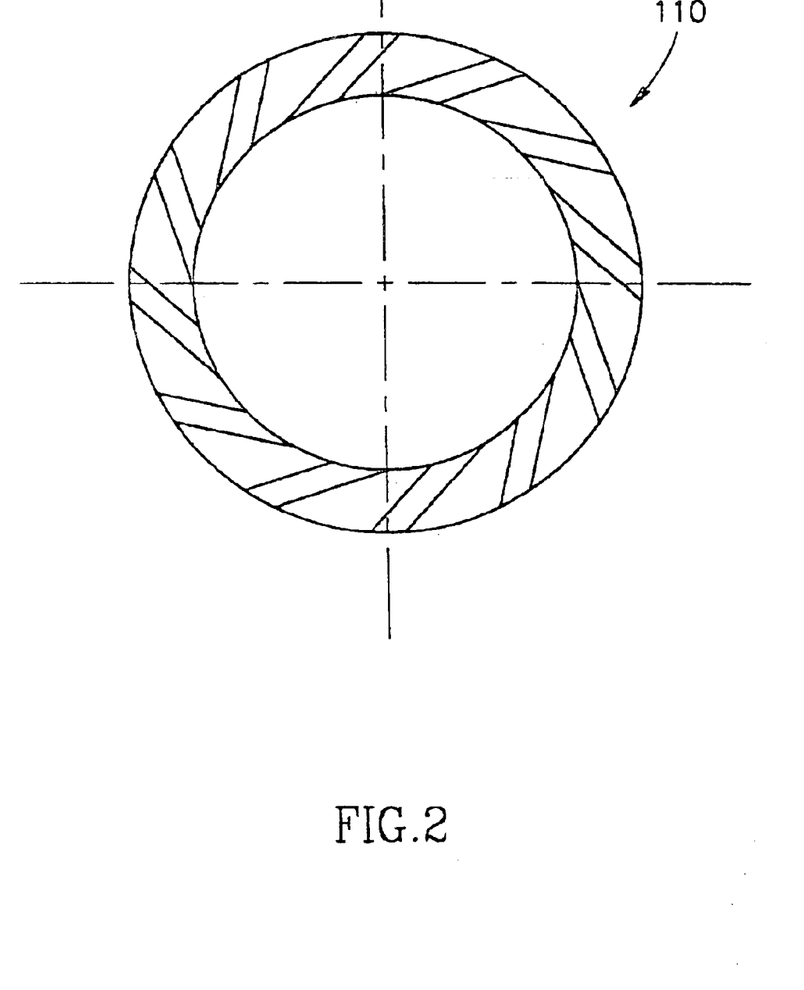
FIG. 2 is a schematic view of an impeller-like ring for use in the reaction chamber of FIG. 1.

Methane as a primary flow 109 is introduced into the reaction chamber 101 in a significantly tangential manner through the impeller-like ring 110, and proceeds to whirl around the longitudinal axis 103. The primary flow 109 is heated by concentrated solar radiation 111 that enters the chamber via the window 105, to a temperature at which the methane will split into hydrogen and carbon black. The carbon black particles suspended in the whirling fluid mixture inside the chamber 101 render the flow 109 opaque to the radiation 111, thereby enhancing its heating and, consequently, increasing the yield of the methane pyrolysis products, which are them withdrawn from the reaction chamber 101 via the outlet 107, whereby the primary flow 109 and the flow of reaction products approximate a free vortex flow.

After initial decomposition of some methane, carbon black particles are formed which directly absorb the solar radiation 111, and thereby considerably enhance the conversion obtained in the process of methane pyrolysis. Further enhancement of the reactor's performance, especially in the start up stage of the process, may also be achieved by introducing solar radiation absorbing particles into the chamber 101, together with the primary flow 109. Preferably these particles are carbon particles that are introduced together with the methane until a sufficient amount of carbon particles produced by the methane decomposition are present in the chamber 101. These solar radiation absorbing particles may be introduced as a mixture with the methane through the primary ingress means 110, or via a separate ingress means (not shown) dedicated to their introduction into chamber 101.

For the protection of the window 105 from contact with the hot components of the reaction, in particular, from the carbon black particles released therefrom, the secondary flow 113 is introduced radially via the secondary ingress means 106 at the window's inner periphery 115 to provide a protective boundary layer 117. This secondary flow 113 is preferably in the gas phase and may be an inert gas or methane, hydrogen or a mixture thereof When no inert gas is used, there is no need for an additional recovery operation to separate the inert gas from the reaction products, downstream from the reactor 100. On the other hand, if methane is used as the secondary flow 113, attention must be given that its flowrate near the window 105 be high enough to ensure that its temperature will not exceed the temperature at which pyrolysis will start, giving rise to the undesired formation of carbon black particles in the vicinity of window 105.

The following synergetic co-operation of the vortex flow, consisting of the primary flow 109 and the flow of reaction products, and the secondary flow 113, prevents carbon black particles in the chamber 101 from reaching the window 105. The vortex flow of the fluid mixture produces a negative radial pressure gradient in the chamber 101, the pressure being highest at a periphery 116 thereof and lowest adjacent the chamber's axis of symmetry 103. This negative radial pressure gradient is essentially balanced by the centrifugal force of the whirling vortex flow. By extracting the reaction products from the chamber 101 through the narrow central outlet 107, the tangential velocity of the whirling fluid mixture becomes essentially inversely proportional to the distance from the axis 103 due to conservation of angular momentum. The negative pressure gradient of the fluid mixture thus becomes inversely proportional to the third power of that distance. This property is extended all the way from the outlet 107 towards the window 105 just as a tornado is extended towards the earth's surface. Since the vortex flow is contained in the axially symmetrical chamber 101, the axes of symmetry of the vortex flow and of the chamber 101 tend to coincide. This is an example of the strong tendency towards two-dimensionality of flow that is observed in confined rotating fluids (see H. P. Greenspan, Theory of Rotating Fluids, Cambridge University Press, 1968, p. 3).

The secondary flow 113 does not participate in the vigorous whirling motion of the vortex flow as it is introduced into the chamber 101 in an essentially radial direction and flows as a thin boundary layer 117 in direct contact with the non-rotating window 105. The strong radial pressure gradient produced by the whirling motion of the vortex flow is felt almost unchanged by the secondary flow 113. This fact is well known in the art (see G. K. Batchelor, Introduction to Fluid Flow Mechanics, Cambridge University Press, 1967, p. 315). In the absence of a centrifugal force to balance the negative radial pressure gradient, the secondary flow 113 is accelerated vigorously towards the centre 103 of the window 105, flowing as a high velocity thin boundary layer 117 on its surface until it is swallowed up at the centre 103 by a narrow "tornado" tube 119.

Without the described whirling effect, the secondary flow 113 would adhere to the window 105 only near the periphery 115 where it is injected, and as it would move towards the center 103 it would be slowed down and separated from the window 105. Therefore, keeping the window 105 protected by the secondary flow 113 without the above described whirling effect, would require a flowrate of secondary gas comparable to the primary gas flowrate, and the secondary flowrate required would get much greater as the diameter of the window 105 increases.

With the described whirling effect present in accordance with the present invention, the negative pressure gradient increases steeply towards the center 103 of the window 105, acting as an anchor to pull the secondary flow 113 from the periphery 115 to the center 103 without separation. The stabilizing effect of a negative pressure gradient on a boundary layer, preventing it from separating, is well known in the art (see Schlichting, Boundary Layer Theory, McGraw-Hill, 1995, p. 100). Thus using this effect for keeping the window 105 protected by the secondary flow 113, enables a secondary flowrate of only a few percent of the primary flowrate, essentially independent of the diameter of the window 105. Moreover, it was verified by experiment that in this flow configuration, the flowrate of the secondary flow 113 does not have to be increased with increasing flowrate of the primary flow 109. On the contrary, increasing the flowrate of the whirling primary flow 109 enhances the negative radial pressure gradient adjacent the window 105 and this has a further stabilizing effect on the secondary flow 113.

It was determined by experiments that with the flow configuration characteristic of the present invention, in the case of the secondary flow 113 flowing at a rate of 0.5 l/min and of the primary flow 109 flowing at a rate exceeding 20 l/min, the secondary flow 113 completely adhered to a 60 mm diameter window 105 over its entire inner surface. The "tornado" tube 119 was attached to the window 105 at a central zone having a 3 mm diameter.

By virtue of the flow pattern characteristic of the present invention, the secondary flow 113 is not heated to the same extent as the primary flow 109 as it does not contact the chamber's periphery 116 to remove heat therefrom and its residence time in the chamber 101 is shorter than that of the primary flow 109. Furthermore, it is not heated by mixing with the primary flow 109 as they do not essentially mix, neither is it heated appreciably by the solar radiation 111 crossing the chamber 101 since it is not loaded with radiation absorbing particles.

The relatively small amount of the secondary flow 113 and its relatively low temperature are advantageous, as significantly less heat from the solar radiation 111 is absorbed thereby and lost, thus increasing the overall receiver yield. Moreover, the fact that the secondary flow 113 reaches a relatively low temperature may enable it to be an inert gas, a product of the reaction (hydrogen in the present embodiment), or even a heat sensitive component of the reaction (methane in the present embodiment).

The high velocity of the secondary flow 113 along the window 105 improves its protection against the possibility of particles clinging to the window 105, and also improves the coefficient of heat transfer by convection therefrom to the secondary flow 113, thereby more effectively cooling the window 105.

Figure 3:
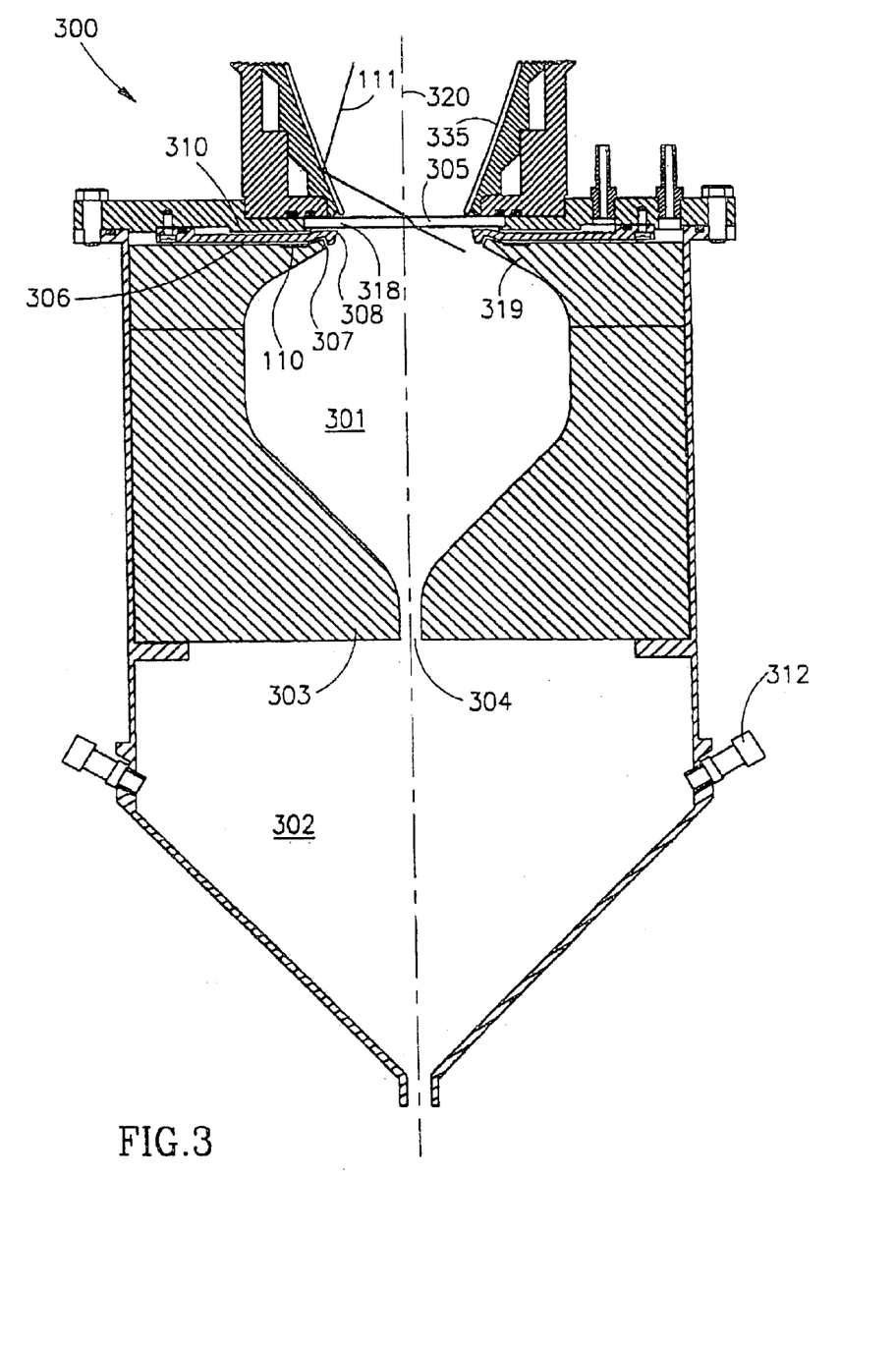
FIGS. 3 to 7 are cross-sectional views of the reaction chamber of FIG. 1 according to different embodiments of the present invention.

FIG. 3 shows a solar receiver using a reactor chamber of the present invention as generally described above, but having additional features for improving the reactor's performance.

In FIG. 3, a solar receiver 300 has a longitudinal axis of symmetry 320, and comprises first 301 and second 302 axi-symmetric chambers separated from each other by a partition 303 which is provided with an outlet 304 located at its center. The receiver 300 is further provided with a transparent window 305 adapted for admitting concentrated solar radiation 111 into the first chamber 301. The receiver 300 is also provided with primary ingress means 307 for admitting a primary flow of methane and secondary ingress means 308 for introducing a secondary flow into the chamber 301. The primary means 307 comprise an annular passage 306, shaped so as to deliver the primary flow into the chamber 301 in a converging manner, directed away from the window 305. The primary ingress means 307 are also designed to impart to the primary flow a whirling motion around the longitudinal axis 320 of the chamber 301. For this purpose, the primary ingress means 307 may comprise the impeller-like ring 110 (shown in FIG. 2), or rather they may have any other suitable design. The secondary means 308 comprise an annular, preferably grooved passage 310 through which the secondary flow is delivered as an essentially radial flow into the chamber 301 along an inner periphery 318 of the transparent window 305.

The initial widening of chamber 301 in the flow direction of the primary flow renders the chamber's diameter larger than the window's diameter and, thereby, makes the chamber's shape closely approximate a black body radiation cavity.

The solar receiver 300 further has a solar concentrator 335 mounted adjacent the window 305 to direct the incident solar radiation 111 into the chamber 301. In order to allow for a wide scattering angle of solar radiation 111 entering the chamber 301, a ceiling portion 319 of the chamber 301 may be thin and thus poorly insulated. Accordingly, the primary ingress means 307 are designed so that the primary flow is introduced into the chamber 301 after absorbing heat from the poorly insulated ceiling portion 319. The absorbed heat is thus recycled into the chamber 301.

A third ingress means (not shown) may be mounted in close proximity to the window 305 and external thereto in order to provide an external cooling flow to the window 305, which may be, for example, essentially radial or tangential.

The reaction products, leaving the chamber 301 through the outlet 304, enter an additional chamber 302, where they are cooled by cooling means, for example, by sprays of water produced by nozzles 312, before entirely leaving the receiver 300. The reaction products leaving the receiver 300 may be delivered to any suitable downstream equipment, such as conventional separation equipment, heat exchanger or any other equipment as known per se in the art.

FIGS. 4 to 7 show further features of the reaction chamber for improving the receiver's performance.

Figure 4:
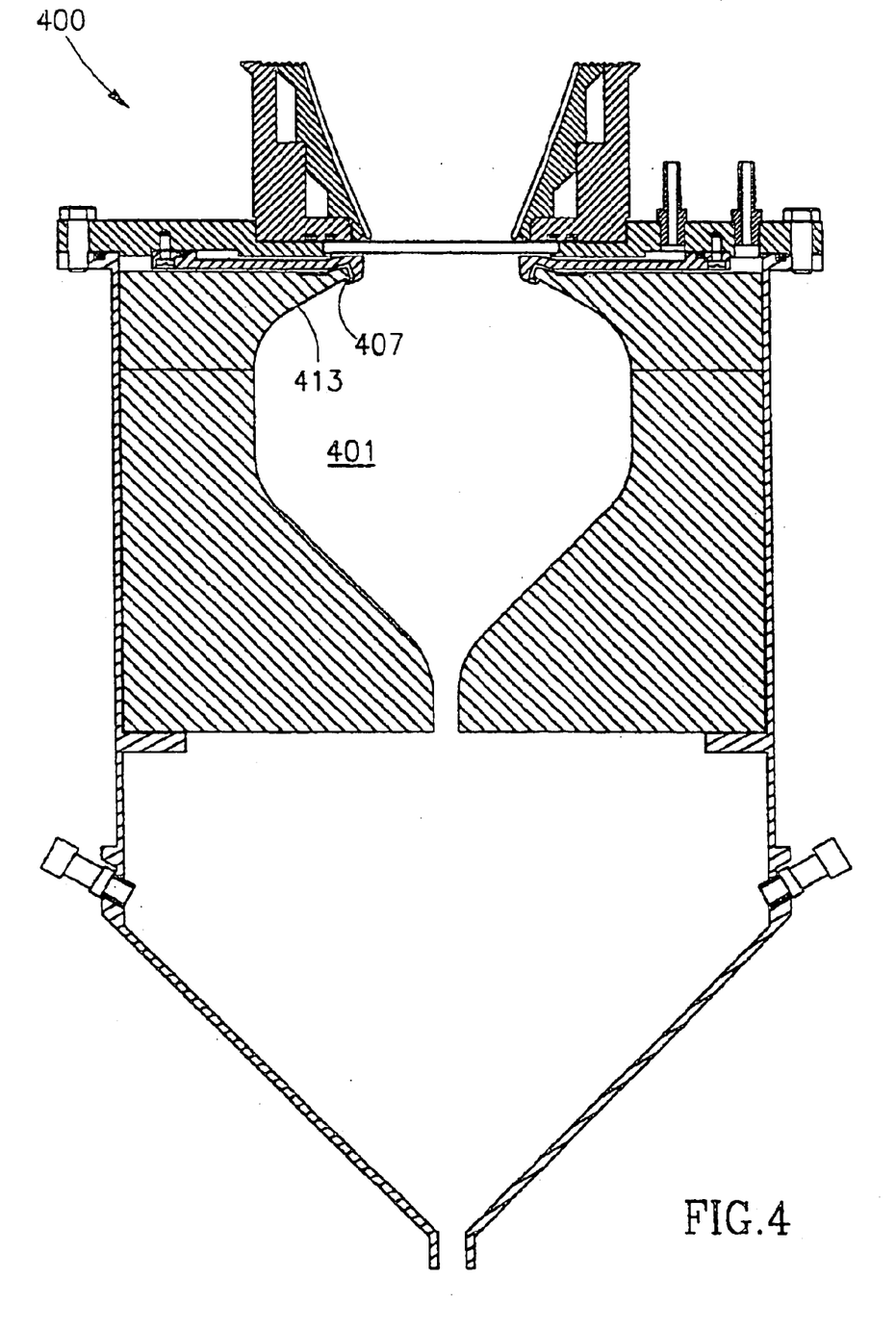

FIG. 4 shows another solar receiver 400 which is similar to the solar receiver 300, but which has primary ingress means 407 that are designed differently in that they discharge into the chamber 401 a divergent conical jet such that the whirling jet enters the chamber 401 along the chamber's interior surface 413. The immediate contact of the primary flow with the hot chamber surface 413 initiates the pyrolysis of methane and the formation of carbon particles, which serve as a very effective agent for absorption of solar radiation and for almost instantaneous transmission of the absorbed heat to the gas in which the particles are suspended.

Figure 5:
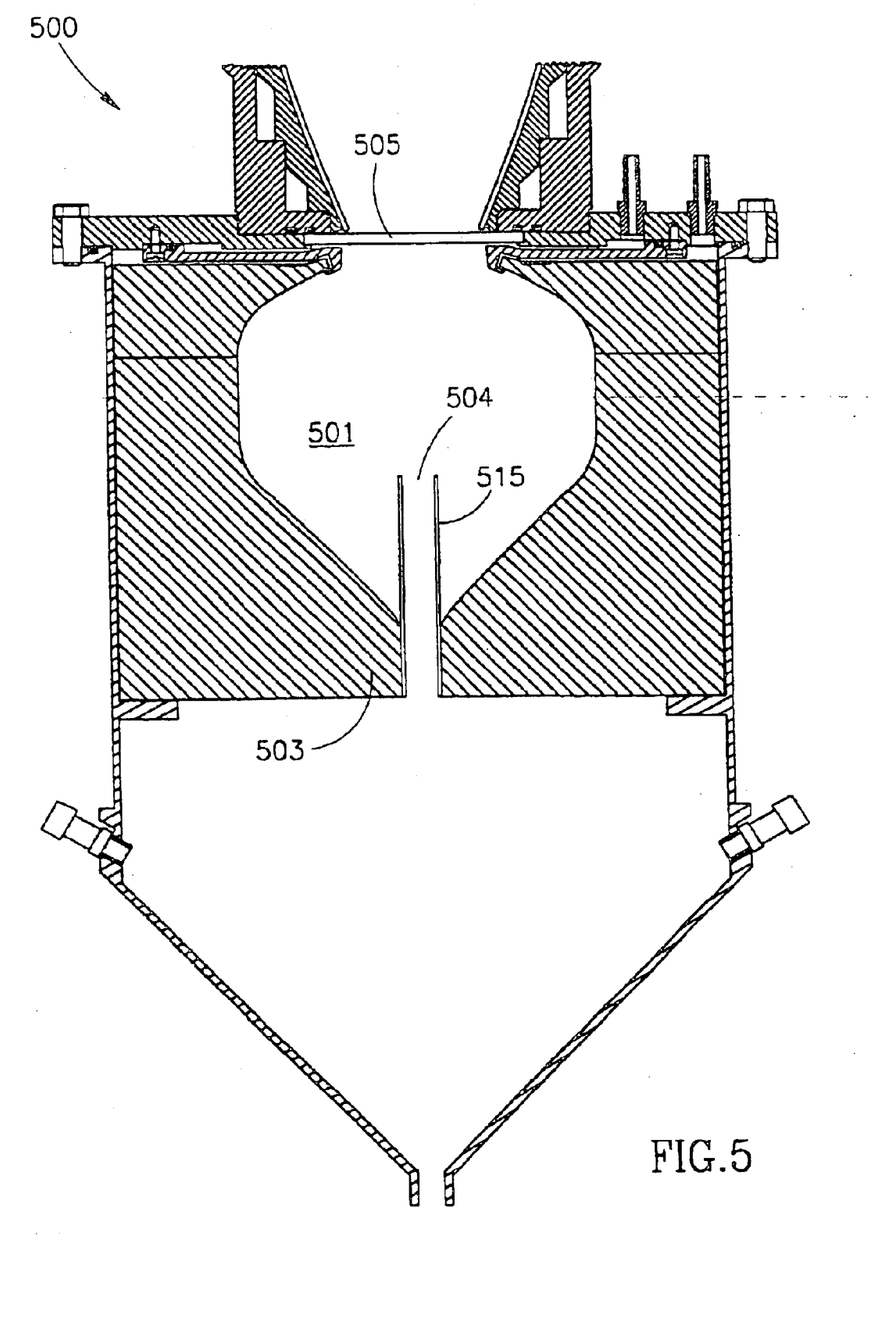

FIG. 5 shows a solar receiver 500 which may have a general design of either of the previous solar receivers 300 or 400, but which has an egress means in the form of a central pipe 515 that protrudes into the chamber 501 through the partition 503, thereby bringing the outlet 504 closer to the window 505. By virtue of this arrangement, the whirling motion pattern inside the chamber 501 may gain additional stability and may not be hampered by buoyancy effects that may be caused by inhomogeneous heating of the gas inside the chamber 501.

Figure 6:
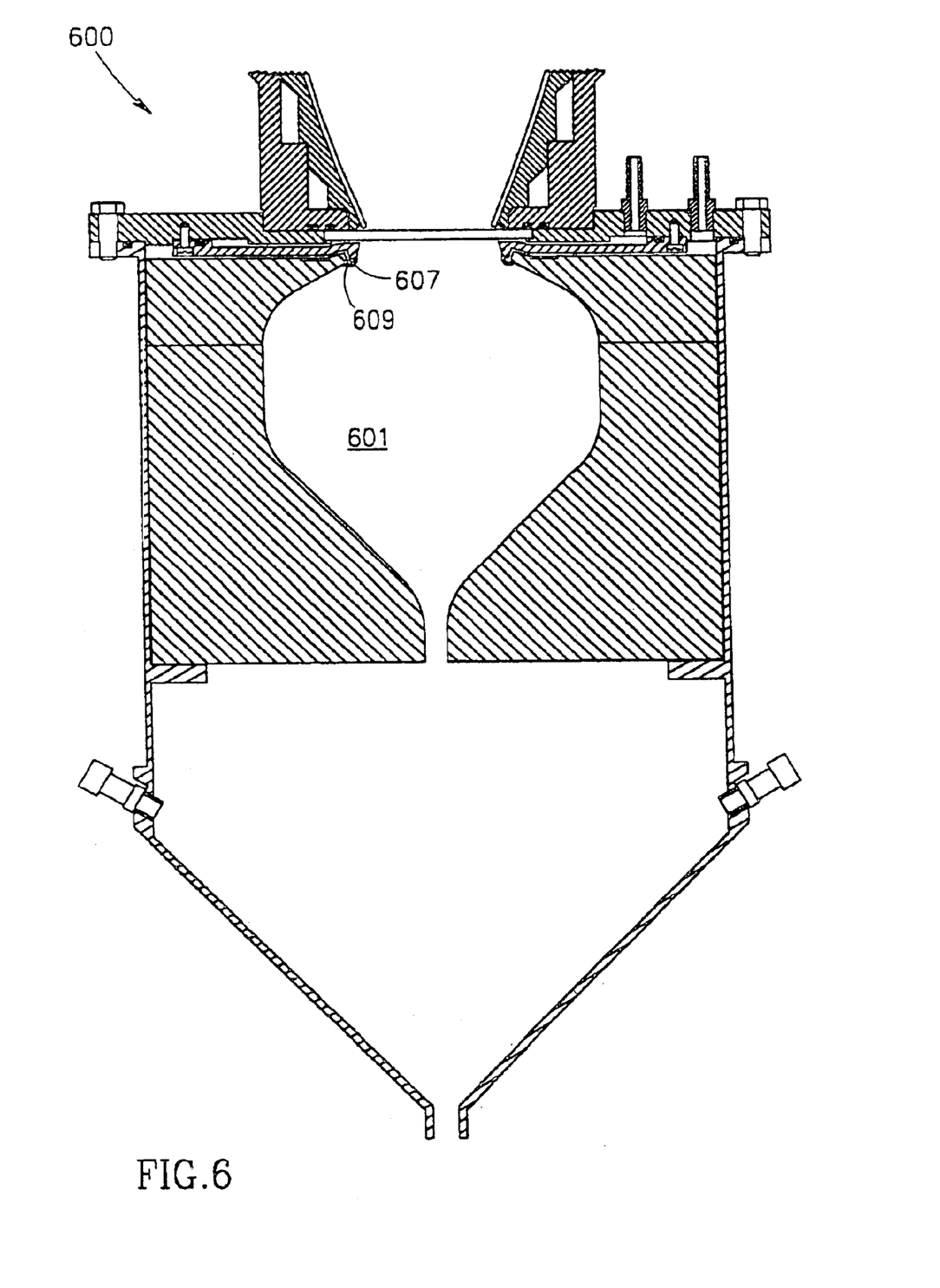

FIG. 6 shows a solar receiver 600 which may have a general design of any of the previous solar receivers 300, 400, or 500, but which has a refractory "flame holder"—type component 609 disposed inside the chamber 601 adjacent the primary ingress means 607, so as to absorb heat from the solar radiation and to heat the primary flow passing therethrough, whereby the reaction is initiated and a continuous production of heat absorbing carbon black particles is sustained.

Figure 7:
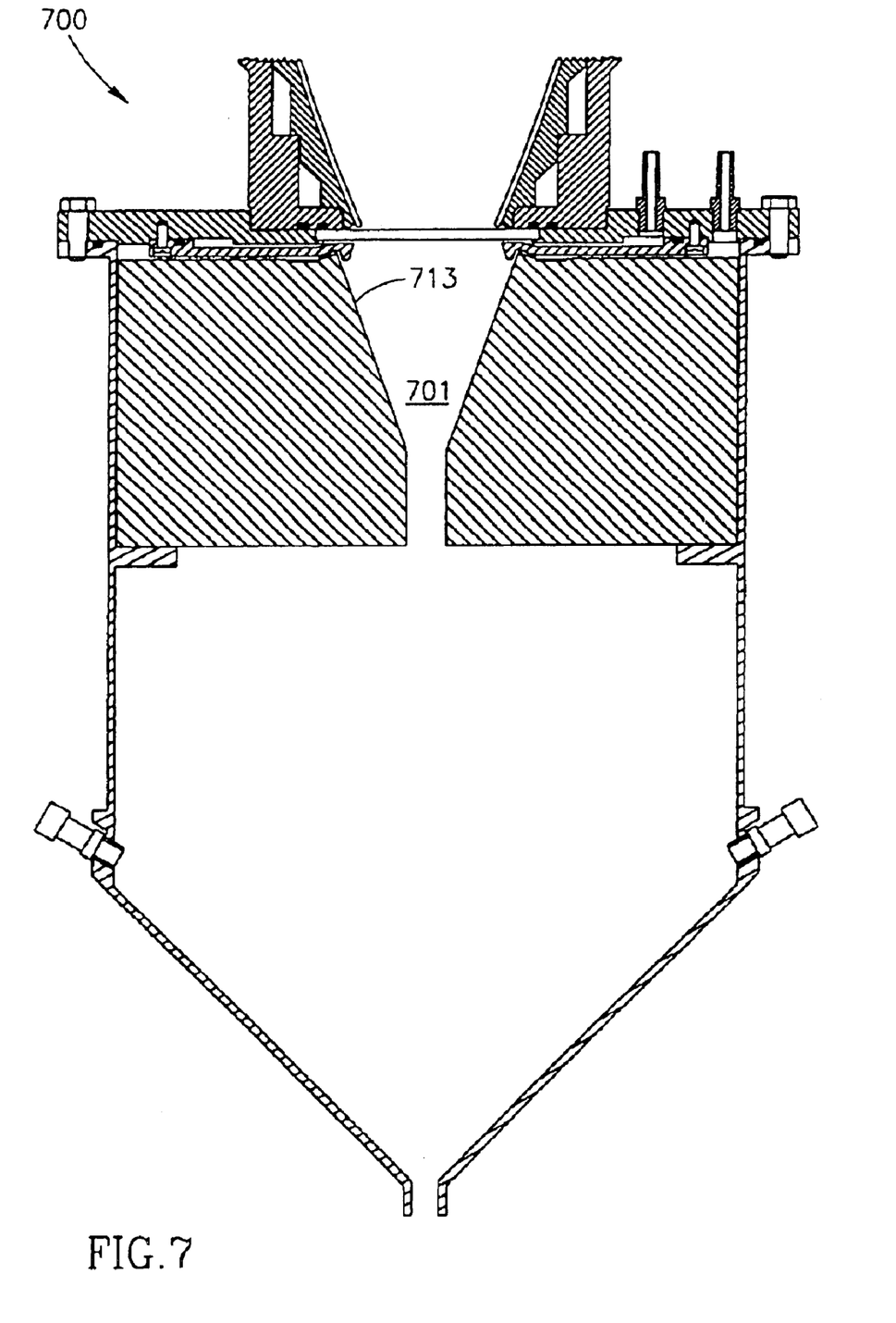

FIG. 7 shows another solar receiver 700 which is similar to the solar receiver 300, but which has a reaction chamber 701 with a tapering surface 713 such that the whirling primary flow enters the chamber 701 along the chamber's hot interior surface 713, initiating the reaction. A chamber 701 of this shape may be advantageous when a shorter residence time is required.

While the invention has been described with respect to preferred embodiments, it will be appreciated that many variations, modifications and other applications of the invention can be made. Particularly, the internal arrangement of the reaction chamber, the overall design of its components, in particular of the transparent window, the primary and secondary ingress means, the egress means and the downstream chamber, may vary, as long as they provided for the primary and secondary flows and their interaction in accordance with the present invention.

What is claimed is:

1. A method for protecting a surface of a reaction chamber having two ends, a longitudinal axis therebetween and a chamber periphery remote from said axis, said surface being disposed at one end of the chamber, transverse to said axis, said surface having a central area close to said axis and a periphery remote from said axis, the method comprising introducing a primary flow of reactants into the chamber from said chamber periphery in a manner whirling around said longitudinal axis, and axially withdrawing reaction products through an outlet disposed close to said axis and axially spaced from said surface towards the other end of the reaction chamber, such that said primary flow and said flow of reaction products approximate a free vortex flow characterized by a negative pressure gradient increasing towards said axis, and introducing at the periphery of said surface a secondary protecting flow directed along said surface towards said axis, enabling thereby said pressure gradient created by said free vortex flow to keep said secondary flow non-separated from said surface substantially over its entire area.

2. A method according to claim 1, wherein said secondary flow is introduced in the chamber at a flow rate lower than that of the primary flow.

3. A method according to claim 1 or 2, wherein said secondary flow is free of any said reactants of the primary flow.

4. A method according to claim 1 or 2, wherein said primary flow comprises a working fluid and said secondary flow is free of said working fluid.

5. A method according to claim 1 or 2, wherein said secondary flow is used to cool said surface.

6. A method according to claim 1 or 2, wherein said primary flow is introduced into the chamber as a conical whirling jet flowing away from said surface.

7. A method according to claim 1 or 2, wherein said primary flow is introduced into the chamber along an interior wall thereof.

8. A method according to claim 1 or 2, wherein radiation absorbing particles are introduced into the chamber in order to elevate said primary flow's temperature and thereby initiate the reaction.

9. A method according to claim 1 or 2, wherein said secondary flow is an inert fluid.

10. A method according to claim 2, wherein the rate of said secondary flow is essentially lower than the rate of said primary flow.

11. A method according to claim 10, wherein the rate of the secondary flow is only a few percent of the rate of the primary flow.

12. A reaction chamber having two ends, a longitudinal axis therebetween, a chamber periphery remote from said axis, and a surface to be protected disposed at one end of the chamber and orientated substantially transversely to said longitudinal axis, said surface having a central area close to said axis and a periphery remote from said axis, a primary ingress means for introducing a primary flow of reactants into the chamber from said chamber periphery in a manner whirling around said longitudinal axis, an egress opening disposed close to said axis and axially spaced from said surface towards the other end of the chamber for withdrawing reaction products from the chamber in an axial flow along the longitudinal axis, whereby said primary flow and said flow of reaction products approximate a free vortex flow characterized by a negative pressure gradient increasing towards said axis, and a secondary ingress means for introducing at the periphery of said surface a secondary protecting flow directed along said surface towards said axis, whereby said pressure gradient created by the free vortex flow keeps said secondary flow non-separated from said surface substantially over its entire area.

13. A reaction chamber according to claim 12, wherein the longitudinal axis passes through said egress opening.

14. A reaction chamber according to claim 12 or 13, wherein the surface to be protected is free of any fluid inlets formed therein.

15. A reaction chamber according to claim 14, wherein the surface to be protected is a transparent window adapted for admitting incident concentrated solar radiation.

16. A reaction chamber according to claim 15, capable of being associated with a solar radiation concentrator via said transparent window.

17. A reaction chamber according to claim 15, wherein said reaction chamber is shaped to approximate a black body radiation cavity.

18. A reaction chamber according to claim 12 or 13, wherein said chamber has walls that are capable of being heated up, and said primary ingress means are arranged so that said primary flow acts to extract heat from said walls prior to being introduced into said chamber.

19. A reaction chamber according to claim 12 or 13, further comprising means for introducing in the chamber refractory material disposed so as to heat said primary flow of reactants.

20. A reaction chamber according to claim 12 or 13, wherein said egress opening is disposed at said other end of the chamber.

21. A reaction chamber according to claim 12 or 13, wherein said secondary ingress means are adapted for introducing in the chamber said secondary flow at a flow rate lower than that of the primary flow.

22. A reaction chamber having a longitudinal axis and a surface to be protected disposed at one end of the chamber and orientated substantially transversely to said longitudinal axis, said surface having a central area close to said axis and a periphery remote from said axis, a primary ingress means for introducing a primary flow of reactants into the chamber in a manner whirling around said longitudinal axis, an egress opening disposed at an opposite end of the chamber for withdrawing reaction products from the chamber in a flow along the longitudinal axis, whereby said primary flow and said flow of reaction products approximate a free vortex flow characterized by a negative pressure gradient increasing towards said axis, and a second ingress means for introducing at the periphery of said surface a secondary protecting flow and directing it toward the central area of the surface, whereby said pressure gradient created by the vortex flow keeps said secondary flow non-seperated from said surface substantially over its entire area, wherein said egress opening is axially extended toward said surface to be protected.

* * * * *